Patented July 26, 1927.

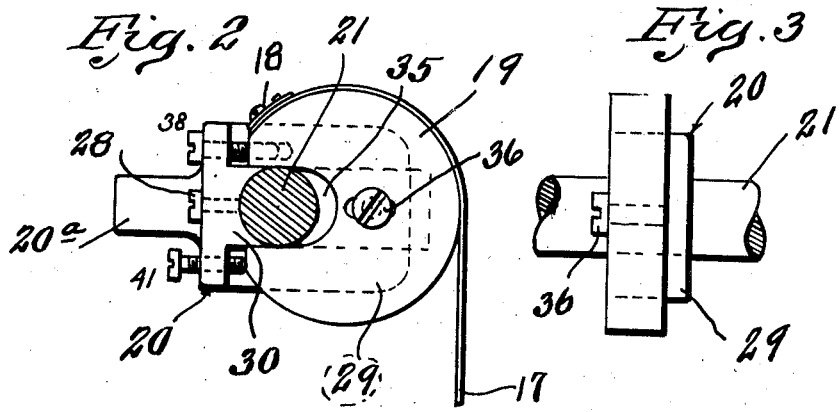
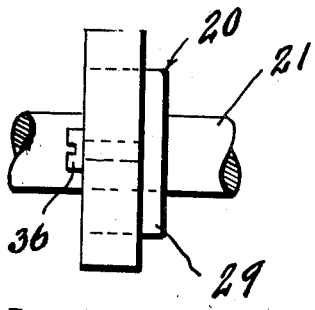
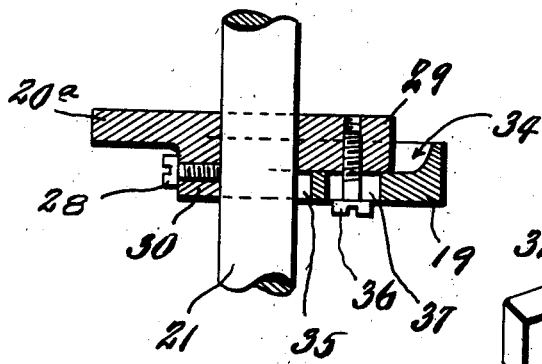
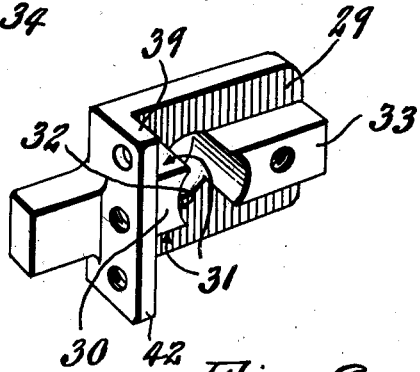
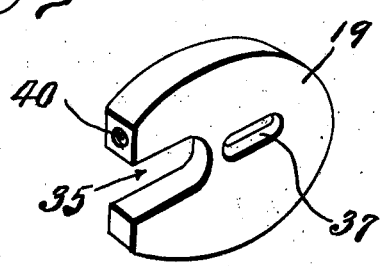
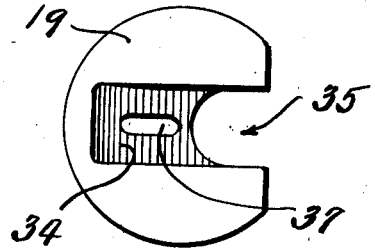

1,636,873

UNITED STATES PATENT OFFICE.

LOUIS S. SHIVELY, OF UNIVERSITY CITY, MISSOURI, ASSIGNOR TO THE WEIGHTO-GRAPH COMPANY, OF ST. LOUIS, MISSOURI, A CORPORATION OF MISSOURI.

ECCENTRICALLY-ADJUSTABLE CAM FOR SCALES.

Application filed June 16, 1925. Serial No. 37,476.

This invention relates to new and useful improvements in scales of the type wherein a suitable weight indicia member is in operative relation with a weighing platform and is operable in accordance with the load placed thereon to indicate the weight. In this type of scale, the operative connection between the chart carrying member and the beam of the scale comprises a flexible connection, for example, a steel tape, one end of which is connected to said beam while the other end is connected to a cam which is operatively associated with the chart carrying member.

The purpose of the cam is to vary the radial distance between the point of its engagement with the flexible connection and the point of oscillation of the chart carrying member in a definite relation in order to correlate the operative movements of the weighing mechanism with the chart member. Heretofore, such a cam was adjustable about the point of oscillation but this adjustment did not vary the eccentricity of the cam, merely adjusting it concentrically with said point of oscillation.

It is the object of the present invention to provide a cam, together with means for mounting the same, whereby the eccentricity of said cam may be varied in order to provide accurate positioning of said cam without the necessity of changing its cam relative to said point of oscillation.

With these and other objects in view, my invention consists in certain novel features of construction and arrangement of parts, hereinafter more fully described and claimed, and illustrated in the accompanying drawings, in which—

Figure 2 is an enlarged side elevation of the cam and its support.

Figure 3 is an end elevation of same.

Figure 4 is a horizontal cross section through the cam and its support.

Figure 5 is a perspective detail view of the supporting member.

Figure 6 is a perspective detail view of the cam.

Figure 7 is a side elevation of the cam showing the reduced side thereof.

Figure 1:
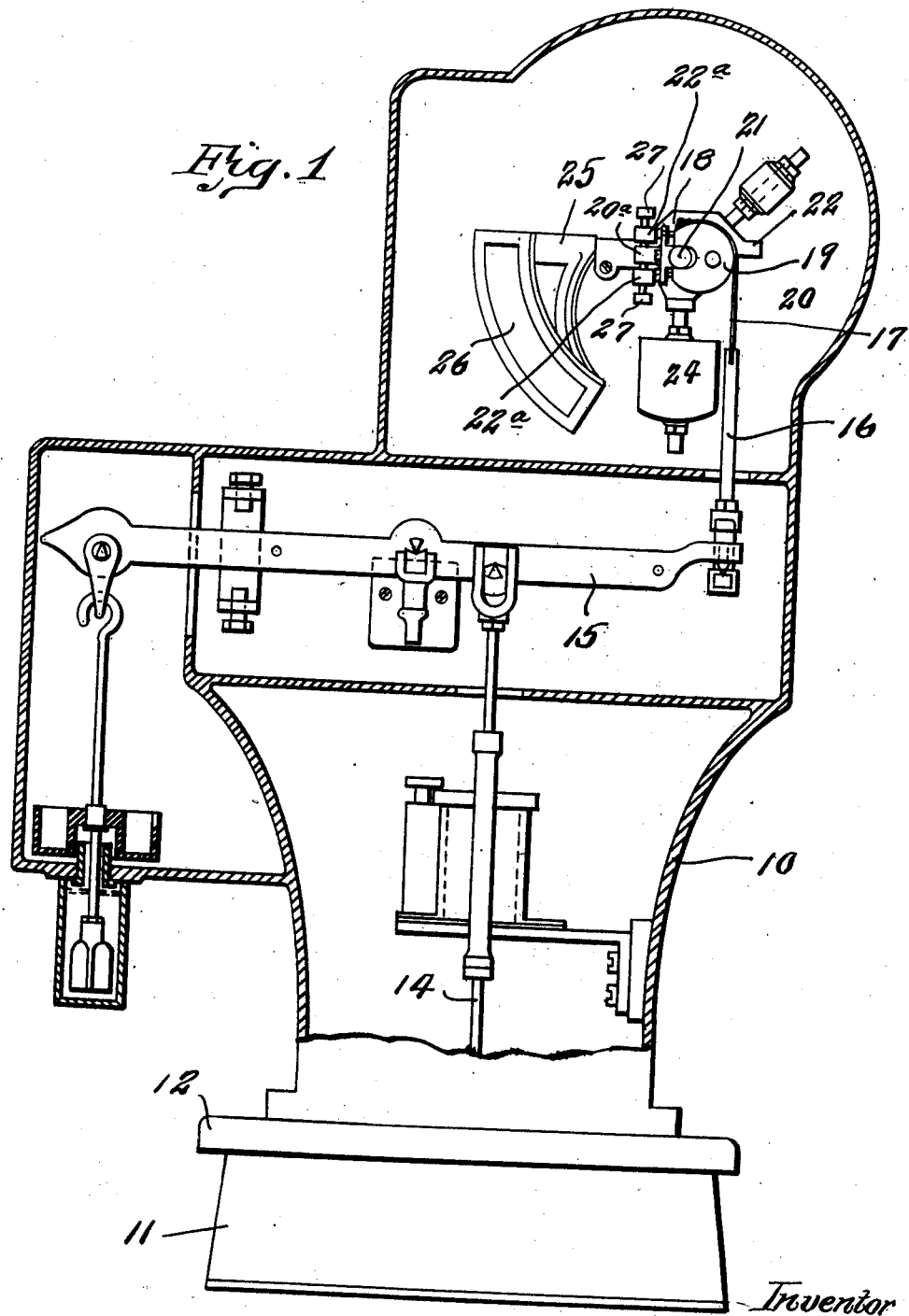
Figure 1 is a vertical cross section through a scale equipped with my improved cam adjustment.

The invention consists of a support associated with the chart carrying member, and adjustable about the point of oscillation thereof, a cam carried by said support and adjustable thereon in a radial direction relative to said point of oscillation in order to vary the distance between the peripheral surface of said cam and said point of oscillation, and means for effecting the adjustment of said cam and locking it against displacement.

Referring by numerals to the accompanying drawings, 10 indicates a scale housing having a base 11 in which is operatively mounted a load receiving platform 12 which is connected by a steelyard 14 to a scale beam 15. A rod 16 extends upwardly from one end of said beam 15 and is connected to one end of a flexible connection, such as a steel tape 17, the opposite end of which is attached at 18 to a cam 19. This cam is mounted in a support 20 which is fixed to a shaft 21 journaled in suitable bearings (not shown) and supports a member 22 having a pendulum 24 and a chart member 25. The member 25 is provided with a weight indicia element 26 having arranged thereon weight indicia which are adapted to be projected by suitable projecting means onto a screen.

When a load is placed on the platform, the beam 15 is actuated and, through the flexible connections 17, operates the cam 19 which, through the parts associated therewith, operates the member 25, whereby the proper weight indicia is positioned in the optical axis of the projecting means and is projected onto the screen.

The movement of the weighing platform is not uniform with the load placed thereon as the latter is increased; for instance, the downward movement of the platform under a two hundred pound load is not double the distance traveled by the platform under a hundred pound load, but is less, due to the increased resistance offered by the scale mechanism. In order to compensate for this differential movement of the scale mechanism, it is necessary to use a cam for imparting uniform movement to the weight indicia member, since the weight indicia arranged on the latter are uniformly spaced from each other.

Commercially, it is impractical to manufacture cams the eccentric faces of which are absolutely accurate. Therefore, I mount the cam adjustably on the member 20 whereby the eccentricity of said cam may be adjusted under actual tests so as to correlate the movements of the load receiving platform and the weight indicia member. This support 20 is adjustable about the axis of the shaft 21 by means of screws 27 seated in extensions 22ª of the member 22; said screws abut against the top and bottom of a projection 20ª which is formed integral with the support 20 and which extends radially therefrom. By turning the screws 27 in the proper direction, the support 20 and cam 19 carried thereby may be adjusted about the axis of the shaft 21. A screw 28 is seated in the support 20 and bears on the shaft 21, thereby locking said support to said shaft.

To permit adjustment of the cam 19 in a radial direction relative to the axis of the shaft 21, the support 20 is formed in the shape of a plate 29, the inner face of which has formed integral therewith a laterally projecting, preferably rectangular, portion 30 having parallel top and bottom faces 31 and provided with an aperture 32 for receiving the shaft 21. Continuing rearwardly from this portion 30, and preferably of the same width therewith, is a shouldered portion 33 which is adapted to be seated in a groove 34 formed in the corresponding face of the cam 19, while the projecting portion 30 is adapted to be received in the open-ended slot 35 of said cam. The slot 35 and groove 34 are of sufficient length to permit movement of said cam longitudinally of the support 20. A screw 36 seated in the support 20 passes through an elongated slot 37 in the cam 19 and is used to lock the cam to the support when the former is properly adjusted. In order to permit accurate adjustment of the cam, a screw 38 passes through an aperture in a laterally disposed ear 39 and is seated in a threaded aperture 40 formed in the cam 19. By turning the screw 38 in the proper direction, the cam 19 can be moved inwardly toward the point of oscillation. A screw 41 is seated in a lateral lug or ear 42 and bears against the cam 19, whereby the latter can be moved outwardly by turning said screw 41 in the proper direction. Of course, it is obvious that by adjusting the cam in either direction, both screws 38 and 41 have to be operated as each one forms a lock against movement of the cam by the other screw. Thus a wide range of adjustment is provided whereby the eccentricity of the cam can be regulated to vary the angles of the various points of contact between the flexible connection and the peripheral face of said cam so as to insure accurate coordination of the movement of the weighing mechanism and the weight indicating means.

I claim:

1. In a scale, the combination with a pivotally mounted weight indicating member, of a support in fixed relation with said indicating member, and a cam having a fixed segmental place carried by said support and fixedly adjustable laterally thereon for varying the eccentricity of said cam.

2. In a scale, the combination with a pivotally mounted weight indicating member, of a support in fixed relation with said indicating member, and a cam having a fixed segmental face mounted on said support and adapted to be operatively connected to a scale mechanism, said cam being adjustable on said support in a lateral direction relative to the point of oscillation of said weight indicating member.

3. In a scale, the combination with a pivotally mounted member carrying weight indicating means, of a support in fixed relation with said pivotal member and adjustable about the axis thereof, and a cam member having a fixed segmental face mounted on said support and adapted to be actuated by a scale mechanism, said cam member being adjustable to vary the distance between the point of oscillation of said pivotal member and the peripheral face of said cam.

4. In a scale, the combination with a weighted oscillatory member and weight indicating means carried by said member, of a support operatively associated with said pivotal member, and a cam having a continuous fixed arcuate face carried by said support and adjustable thereon to vary the eccentricity of said cam.

5. In a scale, a pivoted shaft, a support carried by said shaft, a weight indicating member rigidly connected to said support, means for locking the support in selected circumferential positions on said shaft, a cam member having an arcuate face, said cam member being slidably adjustable in respect of said support, and means for locking the cam member and support in selected adjustments.

6. In a scale, the combination with a pivoted weight indicating member, of a cam adjustable in respect of the pivot of said weight indicating member, a load receiving platform, a connection between the load receiving platform and the cam, said connection including a flexible band having a fixed relationship with the cam, and a device for changing the pivot center of the cam in relation to the pivot of the weight indicating member.

7. In a scale, a pivoted shaft, a support carried by said shaft, a weight indicating member rigidly connected to said support, means for locking the support in selected circumferential positions on said shaft, a cam member having an arcuate face, said cam member being slidably adjustable in respect of said support, means for moving the cam relative to said support, and means for locking the cam member and support in selected adjustments.

8. In a scale, the combination of a scale mechanism including its beam, a revoluble shaft, a weight indicia carrying member fixed to said shaft, a support adjustable on said shaft and in operative relation with said weight indicia carrying member, a cam mounted on said support and adjustable thereon to vary the eccentricity of said cam, and a flexible connection operating over said cam and operatively associated with said beam.

9. In a device of the class described, the combination of a revoluble shaft, an oscillatory member, a support fixed to said shaft and in operative relation with said oscillatory member, a cam having a fixed arcuate face adjustable on said support for varying the eccentricity of said arcuate face of said cam, and a flexible connection in fixed relation with said cam and operating over the peripheral face thereof.

10. In a scale, the combination of a scale mechanism including a beam, a revoluble shaft, a weight indicating member fixed on said shaft, a support adjustable on said shaft and in operative relationship with said weight indicating member, a lock for locking the support in adjustment with said shaft, a cam mounted on said support and adjustable thereon to vary the eccentricity of the cam, means for locking the cam in predetermined adjustments in respect of said support, and a flexible connection operating over said cam and operatively associated with said beam.

In testimony whereof I hereunto affix my signature this first day of June, 1925.

LOUIS S. SHIVELY.